US008022150B2

(12) United States Patent
Esselborn et al.

(10) Patent No.: US 8,022,150 B2
(45) Date of Patent: Sep. 20, 2011

(54) POLYOXYALKYLENE-POLYSILOXANE BLOCK POLYMERS, A PROCESS FOR PREPARING THEM AND THEIR USE AS DEFOAMERS IN AQUEOUS DISPERSIONS

(75) Inventors: Eberhard Esselborn, Essen (DE); Ralf Schnelle, Donaueschingen (DE); Roland Sucker, Werne (DE); Otto Klocker, Essen (DE)

(73) Assignee: Evonik Goldschmidt GmbH (DE)

( * ) Notice: Subject to any disclaimer, the term of this patent is extended or adjusted under 35 U.S.C. 154(b) by 204 days.

(21) Appl. No.: 12/516,619

(22) PCT Filed: Oct. 30, 2007

(86) PCT No.: PCT/EP2007/061641
§ 371 (c)(1),
(2), (4) Date: May 28, 2009

(87) PCT Pub. No.: WO2008/064965
PCT Pub. Date: Jun. 5, 2008

(65) Prior Publication Data
US 2010/0029861 A1    Feb. 4, 2010

(30) Foreign Application Priority Data
Nov. 29, 2006    (DE) .......................... 10 2006 056 305

(51) Int. Cl.
*C08F 283/00*    (2006.01)
*C08G 77/04*    (2006.01)
(52) U.S. Cl. ........................................ 525/474; 528/25
(58) Field of Classification Search .................. 525/474; 528/25
See application file for complete search history.

(56) References Cited

U.S. PATENT DOCUMENTS

| 3,600,418 | A | * | 8/1971 | Bailey et al. | 556/446 |
| 4,150,048 | A | * | 4/1979 | Schilling et al. | 556/444 |
| 5,032,662 | A | * | 7/1991 | Berger et al. | 528/25 |
| 5,472,686 | A | * | 12/1995 | Tsubaki et al. | 424/59 |
| 5,620,684 | A | * | 4/1997 | Dupuis | 424/70.12 |
| 5,650,449 | A | * | 7/1997 | Mukuno et al. | 521/111 |
| 6,187,891 | B1 | * | 2/2001 | Rautschek et al. | 528/25 |

FOREIGN PATENT DOCUMENTS

| DE | 38 07 247 | 5/1989 |
| DE | 3807247 C1 | 5/1989 |

OTHER PUBLICATIONS

International Preliminary Report on Patentability, Jul. 2009.

* cited by examiner

*Primary Examiner* — Randy Gulakowski
*Assistant Examiner* — Robert Loewe
(74) *Attorney, Agent, or Firm* — Frommer Lawrence & Haug LLP

(57) ABSTRACT

The invention relates to the polyoxyalkylene-polysiloxane block polymers of general formula (I) C—B—(AB)$_a$—C$^1$ (I), wherein A=a polyoxyalkylene block of the general formula —(C$_n$H$_{2n}$O)$_b$—, B=a polysiloxane block of the general formula —(SiR$_2$—O)$_c$—, C, C$^1$=the same or different alkoxy-polyoxyalkylene groups of the general formula Z—O—[CH$_2$—CH(R$^1$)O]$_d$—, R=the same or different C$_{1-4}$ alkyl groups or phenyl groups, with the proviso that at least 90% of the groups R are methyl groups, R$^1$=the same or different hydrogen, C$_{1-12}$ alkyl groups or phenyl groups, Z=an alkyl, alkylene, aryl or alkylaryl group, a=1 to 20, preferably 2 to 10, b=an average value of 10 to 130, preferably 20 to 100, c=3 to 100, preferably 10 to 80, d=independently is in the range of C/C$^1$ values of 2 to 20, preferably 2 to 12, with the proviso that the average value is in the range of 2 to <15, preferably 2 to 12, especially 5 to 10, and d is preferably unequal b, n=2 to 12 having an average value of 2.7 to 4.0. The invention also relates to a method for producing said block polymers and to their use in antifoaming agents in aqueous dispersions.

6 Claims, No Drawings

POLYOXYALKYLENE-POLYSILOXANE BLOCK POLYMERS, A PROCESS FOR PREPARING THEM AND THEIR USE AS DEFOAMERS IN AQUEOUS DISPERSIONS

The invention relates to polyoxyalkylene-polysiloxane block polymers, to a process for preparing them, and to their use as deformers in aqueous dispersions.

Defoamers intended for defoaming aqueous and nonaqeuous media and comprising, as the active ingredient critically influencing the defoaming, linearly structured polyoxyalkylene-polysiloxane block copolymers exhibit particular activity and stability. This includes not only the inhibition of foam, the defoaming, a very good long-term stability, but also outstanding compatibility in aqueous and nonaqueous media. All of these factors are of great importance for modern-day processes in the surface technology field.

The term "defoamer" in the present case encompasses not only products but also formulations which prevent foam, and also those which destroy foam and allow air to escape. In practice the transitions between these products are fluid, which is why the common collective term "defoamers" is used here.

In numerous industrial processes, particularly those operated in aqueous media, it is necessary to suppress or entirely prevent the unwanted formation of foam during the production or processing operations, since foam, or foam crowns, which accumulate during stirring and dispersing operations or in the containers during the dispensing procedure, may prolong production times or else reduce the effective volume of the plant, or even prevent its correct operation (overflows, lack of color transfer).

This foam suppression or prevention can be achieved by adding defoamers, which—even when used at very low concentrations, starting at about 0.001% by weight—are capable of preventing or destroying unwanted foam, and at the same time, following application of the systems, of not giving rise to any surface defects. In practice it is necessary to take account of this last factor to at least the same extent as effective defoaming.

Surface defects are, for the user, unwanted characteristics such as pinholes, craters, loss of gloss, orangepeel effect, wrinkling, and loss of adhesion in the coating system. For the user, however, a corresponding long-term stability on the part of the formulations is also very important, since, often, products such as paints are not used immediately but occasionally are used only after prolonged storage. In the case of storage under extreme climatic conditions (heat) the activity of a defoamer formulation may occasionally break down after just a short time.

Prior art defoamers are, for example, oils, such as silicone oils, natural oils, paraffin oils, and mineral oils, but also hydrophobic polyoxyalkylenes, long-chain alcohols, and mixtures of these products with one another, and their emulsions.

To boost the activity it is common to add what are called hydrophobic solids in amounts from 0.1% to 10% by weight, which provide for targeted promotion of dewetting processes at foam lamellae and hence very effectively support foam collapse. Suitable hydrophobic solids are corresponding silicas, metal stearates, polyolefins, and natural or synthetic waxes such as paraffin waxes, polyolefin waxes, and amide waxes.

By adding suitable emulsifiers it is also possible to convert defoamer formulations of this kind into aqueous emulsions.

It is likewise known to use polyoxyalkylene-polysiloxane block copolymers as defoamers. Thus it is specified in DE 10 12 602, for example, that one of the possible applications of water-soluble block copolymers of the general formula

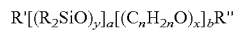

in which
R' and R" are monovalent hydrocarbon radicals or hydrocarbonoxy radicals,
y is an integer of at least 2,
n is an integer from 2 to 4,
x is at least 5,
and the sum of
a and b is 2 or 3
is as antifoams. The polyoxyalkylene-polysiloxane block copolymers described in DE 10 12 602 can have the structure A'B'A', where A' denotes the polyoxyalkylene blocks and B' a polysiloxane block.

DE 24 43 853 describes preparations with a defoaming action which contain not only linear but also branched polyoxyalkylene-polysiloxane block copolymers. The linear component of this mix may be described as follows:

in which
A are polyoxyalkylene units,
B are polysiloxane groups [—$(CH_3)_2SiO$—], and
R are the end groups which cap off the polymer. In the incidences presented these groups are preferably hydrogen or short alkyl groups ($C_{1-4}$); in some cases, acyl groups with $C_2$ to $C_{12}$ have been described as well.

U.S. Pat. No. 4,028,218 describes a method of preventing or destroying foam in aqueous solutions or dispersions, using a similar preparation to that described in DE 24 43 853. The preparation differs essentially in the additional presence of organic oil, which likewise has a defoaming action.

Suitable organic oils are the esters of alcohols and fatty acids, such as vegetable or animal oils, for example, or mineral oils, polybutadiene oils or polypropylene glycols.

Comparable to U.S. Pat. No. 4,028,218, in DE 31 23 103 a mineral-oxide-free mixture of:
A) 1% to 20% by weight of at least one polydimethylsiloxane-polyoxyalkylene block polymer composed of 10% to 60% by weight, preferably 15% to 40% by weight, of methylsiloxane units and of 90% to 40% by weight, preferably 85% to 60% by weight, of oxyalkylene units, the oxyalkylene units being composed to an extent of 75% to 100% of oxypropylene units and to an extent of 0% to 25% of oxyethylene units;
B) 99% to 80% by weight of at least one neutral carboxylic ester of saturated or unsaturated, straight-chain or branched monocarboxylic or dicarboxylic acids having 4 to 12 carbon atoms and branched monoalcohols having 4 to 12 carbon atoms
is used as a defoamer in aqueous synthetic-resin dispersions.

These polyoxyalkylene-polysiloxane block copolymers, included in the mixture in an amount from 1% to 20% by weight, can have the structure A'-[B'-A']$_z$, where z can adopt a value from 1 to 3.

These preparations known from the prior art and comprising silicone oils or polyoxyalkylene-polysiloxane block copolymers are suitable, to a more or less pronounced extent, for preventing the formation of foam by aqueous solutions or aqueous dispersions, or for destroying foam which has already formed. It has been found, however, that aqueous dispersions to which preparations of this kind are added have performance disadvantages as a result of the addition of such defoamers. In particular it has been found that dispersions of binders, coating materials, and adhesives to which polysiloxanes or polyoxyalkylene-polysiloxane block copolymers have been added for the purpose of defoaming exhibit wetting defects when applied to surfaces. This disadvantage is countered by DE 38 07 247 through the use of polyoxyalkylene-polysiloxane block copolymers in which the polyoxyalkylene block of the average formula $(C_nH_{2n}O-)_y$ is constructed from oxyethylene, oxypropylene and/or oxybutylene units in such a way that n takes on a value of 2.8 to 4.0.

It has further been found, however, that dispersions of binders, coating materials, and adhesives to which the aforementioned polysiloxanes or polyoxyalkylene-polysiloxane block copolymers have been added for the purpose of defoaming often exhibit inadequate storage stability. However for inks and paints this parameter is essential, since products are stored for up to several months prior to preparation, and at temperature ranges of just above 0° C. to approximately 50° C.

It is an object of the present invention, therefore, to provide suitable polyoxyalkylene-polysiloxane block copolymers whose aqueous dispersions exhibit good defoaming properties but at the same time do not give rise to any wetting defects when applied to a surface and, furthermore, exhibit improved stability on storage.

This object that forms the basis for the invention can surprisingly be achieved using polyoxyalkylene-polysiloxane block polymers of the general formula (I)

$$C\text{-}B\text{-}(AB)_a\text{-}C^1 \qquad (I).$$

The invention accordingly provides polyoxyalkylene-polysiloxane block polymers of the general formula (I)

$$C\text{-}B\text{-}(AB)_a\text{-}C^1 \qquad (I)$$

in which
A is a polyoxyalkylene block of the general formula $-(C_nH_{2n}O)_b-$,
B is a polysiloxane block of the general formula $-(SiR_2-O)_c-$,
C and $C^1$ are identical or different alkoxy-polyoxyalkylene radicals of the general formula $Z\text{-}O-[CH_2-CH(R^1)O]_d-$,
R are identical or different $C_{1-4}$ alkyl radicals or phenyl radicals, with the proviso that at least 90% of the radicals R are methyl radicals,
$R^1$ are identical or different hydrogen, $C_{1-12}$ alkyl radicals or phenyl radicals,
Z is an alkyl, alkylene, aryl or alkylaryl radical,
a is 1 to 20, preferably 2 to 10,
b is an average value from 10 to 130, preferably 20 to 100,
c is 3 to 100, preferably 10 to 80,
d is independently at each occurrence in $C/C^1$ values from 2 to 20, preferably 2 to 12, with the proviso that the average value is situated in the range 2 to <15, preferably 2 to 12, more particularly 5 to 10, and in which d is preferably different than b,
n is 2 to 12, with an average numerical value of 2.7 to 4.0.

The invention further provides for the use of the polyoxyalkylene-polysiloxane block polymers of the general formula (I) for defoaming aqueous dispersions.

Further subject matter of the invention is characterized by the claims.

The polyoxyalkylene-polysiloxane block polymers of the invention are prepared by methods which are known per se, by reacting the alcohol components A and C, $C^1$ with chloropolysiloxanes in the molar ratio range of A:C, $C^1$ from 3 to 40, preferably from 3 to 10,
(A+C, $C^1$):chloropolysiloxanes from 1.3 to 1.05, preferably from 1.3 to 1.1,
at temperatures from 50° C. to 150° C., and subsequently carrying out neutralization with ammonia.

The polyether alcohols are preferably polyetherdiols, polyetherpolyols, or mixtures of polyetherdiols and polyetherpolyols (component A) and also a polyethermonool (component C, $C^1$).

The chloropolysiloxanes, based on the polyoxyalkylene block siloxanes B, are linear or branched or are composed of mixtures of linear and branched chloropolysiloxanes.

The polyether alcohols A are prepared by addition reaction of alkylene oxides, in accordance with the invention preferably ethylene oxide, propylene oxide, with polyhydric starter alcohols of the general formula $$R^2\text{-}[O-H]_e$$

in which
$R^2$ can be an e-valent hydrocarbon radical and
E can be 2 to 6, preferably 2 to 3,
by the alkoxylation processes known in the prior art. As starter alcohols it is possible in principle to use all straight-chain or branched alcohols that are at least dihydric. Preferred in accordance with the invention are dihydric and/or trihydric alcohols such as, more particularly, ethanediol, propanediol, butanediol, hexanediol, and trimethylolpropane, which can be used alone or as a mixture.

The polyether alcohols C and $C^1$ can be prepared in principle in the same way as the polyether alcohols A, with the modification that the starter alcohols used are monofunctional compounds Z-OH in which Z can be an alkyl, alkylene, alkylaryl or aryl radical which optionally is branched and/or contains multiple bonds and which has 1 to 20 C atoms, preferably 1 to 10 C atoms.

The polysiloxane block corresponds to the average general formula

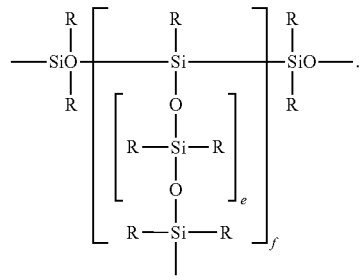

It can be straight-chain (f=0) or branched (f>0 to 20). Preferred in accordance with the invention are compounds with f=0. Within the polysiloxane block, R may have identical or different definitions. R may be an alkyl radical having 1 to 4 C atoms or a phenyl radical. Examples of radicals R are the methyl, ethyl, propyl, n-butyl, and isobutyl radical. At least 90% of the radicals R, however, ought to be methyl radicals, preference being given to those polysiloxane blocks in which all of the radicals R are methyl radicals.

In accordance with the prior art it is possible to add up to 20% by weight of finely divided organic or inorganic solids to the polyoxyalkylene-polysiloxane block copolymers for use in accordance with the invention, said amount being based on these copolymers. Examples of inorganic solids are optionally hydrophobized silica, aluminum oxide or similar typical finely divided solids known from the prior art. As finely divided organic substances it is possible to use the alkaline earth metal salts, known for this purpose, of long-chain fatty acids having 12 to 22 carbon atoms, or the amides of these fatty acids. Further suitable organic solids are derivatives of urea and can be obtained by reacting isocyanates with amines.

The defoamers of the invention display an outstanding defoaming capacity in conjunction with very good long-term stability of the defoaming effect and a very good compatibility in the coating formulation, and can be employed in a multiplicity of industrial operations, such as, for example, for the defoaming of cooling lubricants, polymer dispersions, coatings such as paints, varnishes, and printing inks, adhesives, in paper coating, etc.

They can be added in an amount from about 0.05% to 3%, directly or in dissolved form, but preferably as an aqueous emulsion, to the liquids with a tendency to form foam, or can be added by dripping or spraying of the defoamer in the working region of stirrer mechanisms and pumps. If they are added in a pure, unpredispersed form, appropriate incorporation must be ensured.

PREPARATION EXAMPLES

Preparation of Polyetherdiols

The polyetherdiols are prepared in a conventional way, with a starter alcohol being subjected to addition reaction with different alkylene oxides at temperatures from 80° C. to 180° C. in different proportions, in the presence of a catalyst, more particularly potassium methoxide. After the polyaddition reaction, the polyethers are neutralized with dilute phosphoric acid and the phosphate formed is precipitated as a salt, by removal of the water, and removed by filtration. Chemical characterization is carried out through determination of the OH number.

The following polyetherdiols and -triols were prepared (Table 1):

TABLE 1

| Polyether No. | Starter alcohol | Epoxide | OHN (mg KOH/g) | MW (g/mol) from OHN |
|---|---|---|---|---|
| P1 | Butanediol | Propylene oxide | 112 | 1000 |
| P2 | Propylene glycol | Propylene oxide | 73 | 1537 |
| P3 | Propylene glycol | 90% Propylene oxide and 10% ethylene oxide | 52 | 2158 |
| P4 | Hexanediol | 80% Propylene oxide and 20% ethylene oxide | 75 | 1496 |
| P5 | Butanediol | 50% Propylene oxide and 50% ethylene oxide | 61 | 1839 |
| P6 | Propylene glycol | 70% Propylene oxide and 15% styrene oxide and 15% ethylene oxide | 55 | 2040 |
| P7 | Trimethylolpropane | Propylene oxide | 109 | 1544 |

Preparation of Polyethermonools

The polyethermonools are prepared in the same way as described for the polyetherdiols, but with the difference that exclusively monools are used as starter alcohols (Table 2).

TABLE 2

| Polyether No. | Starter alcohol | Epoxide | OHN (mg KOH/g) | MW (g/mol) from OHN |
|---|---|---|---|---|
| K1 | Butanol | Propylene oxide | 132 | 425 |
| K2 | Allyl alcohol | 80% Propylene oxide and 20% ethylene oxide | 108 | 520 |
| K3 | 2,2,4-trimethyl-hexan-1-ol | 50% Propylene oxide and 50% butylene oxide | 110 | 510 |
| K4 | Butanol | Propylene oxide | 86 | 650 |
| K5 | Octanol | 80% Propylene oxide and 20% styrene oxide | 70 | 800 |
| K6 | Methanol | 85% Propylene oxide and 15% ethylene oxide | 154 | 365 |
| K7 | Butanol | Propylene oxide | 226 | 248 |

Preparation of Chloropolysiloxanes

The linear and branched chloropolysiloxanes are prepared in a conventional way, with a mixture of the cyclic compounds D4 and D5 being mixed in a defined proportion with dimethyldichlorosilane or methyl-trichlorosilane, respectively, where appropriate with addition of water to control chain length and degree of branching, and this reaction mixture being, additionally, equilibrated by addition of what is called an equilibration catalyst, such as sulfuric acid, methanesulfonic acid, trifluoromethanesulfonic acid or iron(III) chloride, for example. In this reaction an equilibrium is formed between the cyclic compounds and a chlorine-functional dimethyl-polysiloxane. This reaction mixture can be used immediately for the further reaction. Where iron(III) chloride is the catalyst used, however, it is advisable to remove the catalyst with activated carbon beforehand, in order to rule out unwanted discoloration resulting from the presence of the iron catalyst. Where linear chloropolysiloxanes are used, the method with iron(III) chloride is preferred. Chemical characterization is carried out through determination of the acid value. The dimensional unit is reported in acid equivalents per kg of chlorodimethylpolysiloxane (Table 3).

TABLE 3

| Chloro-siloxane No. | Amount of dimethyl-dichlorosilane used [g] | Amount of methyltri-chlorosilane used [g] | Amount of D4/D5 used [g] | Acid value [acid equivalents per kg] |
|---|---|---|---|---|
| S1 | 27.2 | — | 220 | 1.61 |
| S2 | 129 | — | 629 | 2.53 |
| S3 | 65 | — | 783 | 1.11 |
| S4 | 32.3 | — | 787 | 0.59 |
| S5 | — | 59.8 | 445 | 2.61 |

Preparation of Invention Polyetherpolysiloxanes
Preparation Instructions

A 1-liter four-neck flask with stirrer, thermometer, distillation system, and gas inlet tube is charged with 250 g of polyetherdiol P1 together with 21.3 g of polyether K1. The mixture of polyoxyalkylene oxides is then heated to 110° C. with introduction of dry nitrogen. When the desired temperature has been reached, the unit is evacuated using a rotary oil vacuum pump, and a vacuum of approximately 10 mm is set by introduction of nitrogen. After 1 hour the water content of the mixture is <0.02% and the mixture has therefore been prepared for reaction with the chloropolysiloxane. The batch is cooled to 50° C.

Under inert conditions, under a nitrogen countercurrent, 248.5 g of chloropolysiloxane S1 are weighed out using a syringe into a dropping funnel which has been dried at 100° C. beforehand and has gas compensation, gas inlet tubes, and a top-mounted drying tube. The distillation apparatus is then swapped for this dropping funnel, and the chloropolysiloxane is added dropwise over the course of 30 minutes. Ammonia is introduced to accelerate the reaction, and ammonium chloride is precipitated. After 1 hour the batch is heated to 80° C. and the introduction of ammonia is continued until a sample on moist pH paper no longer shows any traces of acid. The dropping funnel is then swapped again for the distillation system, and the excess, dissolved ammonia is removed from the reaction mixture by application of a vacuum of approximately 133 Pa. After cooling to room temperature, the batch is filtered. This gives a liquid, clear, colorless end product having a Höppler viscosity at room temperature of approximately 2000 mPas.

The products listed in Table 4 can be obtained by operating in general accordance with the preparation instructions above.

For the purpose of testing, the polyethersiloxanes were admixed with disperse, hydrophobized silica (3% by weight) and were converted using nonionic emulsifiers (mixture of polyoxyethylene fatty alcohol ether and polyoxyethylene triglyceride, with a mixture HLB of 13) into a 20%, aqueous defoamer emulsion.

Testing of Inventive Products I

The tested emulsions (Example E1 to E4) were prepared with the polyethersiloxanes according to Table 5.

TABLE 5

| Emulsion | Polyethersiloxane |
|---|---|
| Example E1 | PES 1 |
| Example E2 | PES 2 |
| Example E3 | PES 3 |
| Example E4 | PES 4 |

Testing in Colored Paper Coating Slip

At 20° C., 100 g of the colored paper coating slip Unilabel T from SICPA S.A. Germany, 71522 Backnang, to which 0.2% defoamer has been added, are introduced into a 250 ml glass beaker (6 cm diameter) and stirred at 2500 rpm using a turbine stirrer (4 cm diameter) for 1 minute. The stirred coating slip is then immediately introduced into a tared volumetric flask, made up to the calibration mark, and the weight is ascertained by weighing. The weight is dependent on the proportion of air incorporated by stirring, and is therefore a measure of the effectiveness of the antifoam tested. The air content can be calculated using the following formula:

$$\% \text{ by volume of air} = 100 - (g*2)/D$$

g = weight of 50 ml of stirred coating slip
D = density of air-free coating slip To test the compatibility, the dispersion with defoamer added is knife-coated onto a PE film. After the coating has dried it is then inspected (Table 6).

| Example PES No. | Polyether No. | Polyether mol (*) | Polyether g | Polyether No. | Polyether mol | Polyether g | Cl-siloxane No. | Cl-siloxane mol | Cl-siloxane g |
|---|---|---|---|---|---|---|---|---|---|
| Comparative PES1 | P3 | 5 | 333.4 | — | — | — | S1 | 4 | 153.5 |
| PES2 | P5 | 5 | 177.2 | K5 | 2.5 | 38.9 | S3 | 6 | 212.1 |
| PES3 | P6 + P7 | 8 + 2 | 229.4 + 43.4 | K6 | 2 | 33.7 | S1 | 9 | 157.1 |
| PES4 | P3 | 5 | 333.4 | K1 | 1.5 | 19.6 | S1 | 4 | 153.5 |
| Further possible polyethersiloxanes | | | | | | | | | |
| PES5 | P2 | 10 | 306 | K2 | 2 | 20.7 | S2 | 11 | 173.0 |
| PES6 | P4 | 10 | 272.2 | K4 | 1 | 11.8 | S3 | 9 | 294.8 |
| PES7 | P3 | 4 | 374.0 | K7 | 1 | 10.7 | S1 | 4 | 215.2 |
| PES8 | P4 | 6 | 199.8 | K3 | 3 | 34.1 | S3 + S5 | 6 + 1 | 240.5 + 25.6 |
| PES9 | P3 | 3 | 257.9 | K4 | 2 | 51.8 | S1 | 4 | 197.9 |
| PES10 | P1 | 10 | 243.1 | K3 | 3 | 37.2 | S1 | 11 | 332.1 |

(*) Note:
The mol figures report the molar ratio of the components to one another.
The gram figures report the actual initial mass.

TABLE 6

| | 2 hours after incorporation of defoamer | | 2 weeks' storage at RT after incorporation of defoamer | |
|---|---|---|---|---|
| | % by volume of air | Drawdown | % by volume of air | Drawdown |
| No defoamer | 13.5 | foam bubbles | 13.8 | foam bubbles |
| Example E1 (not inventive) | 3.2 | slight wetting defects | 12.7 | foam bubbles |
| Example E2 | 3.1 | no wetting defects | 4.3 | no wetting defects |
| Example E3 | 2.8 | slight wetting defects | 3.7 | no wetting defects |
| Example E4 | 2.9 | slight wetting defects | 3.2 | no wetting defects |

Testing of Inventive Products II

To test the defoaming action of the inventive products in comparison to prior art products, an open-pored foam roller test and a stirring test are carried out.

In the case of the foam roller test, the products to be tested are incorporated into a high-gloss emulsion paint based on a straight acrylate dispersion and, respectively, into woodblock flooring varnishes (1-component and 2-component respectively). After an ageing time of 24 hours at room temperature, the defoamer emulsions present in the paints and varnishes, respectively, are tested for their defoaming action.

For this test, 40 g of the paint (15 g in the case of the woodblock flooring varnish) are applied to a painted contrast chart (24 cm×21 cm, black/white) and distributed uniformly using the open-pored foam roller (or using a mohair roller in the case of the woodblock flooring varnish). After a drying time of 24 hours at room temperature for the paint or the varnishes, the surface of the coat is inspected for foam bubbles and defects (wetting defects). Thereafter the results are graded in accordance with a rating system (from 1, for no foam bubbles and no wetting defects, to 5, for numerous foam bubbles and numerous wetting defects (craters)).

In addition a stirring test is carried out with the varnish from formula 3. The purpose of this stirring test is also to test the products for their defoaming action. For this test, 50 g of the varnish are weighed out into a 180 ml PE beaker and are stirred at 3000 rpm using a dispersing disk, d=30 mm, for 3 minutes. Immediately after the end of the stirring test, 45 g of the stirred varnish are dipped into a measuring cylinder and the volume (plus foam height) is read off. The lower the volume or the foam height, the more effective the defoamer. Thereafter the varnish is tipped off onto a polyester film which in turn is affixed to an inclined wall (with a deviation of 25° from the vertical). During and after the drying of the varnish, the film is assessed for wetting defects. As in the case of the assessment described above, again, the wetting defects and also the foam present are assessed according to ratings of 1 to 5 (Tables 7 to 10).

TABLE 7

| High-gloss emulsion paint based on straight acrylate (Acronal DS 6250) | | | | | | | |
|---|---|---|---|---|---|---|---|
| | | Optical assessment of paint surface for foam bubbles | | | Optical assessment of paint surface for wetting disruption | | |
| Sample designation | Concentration used | 24 h after preparation of the paint | After hot storage of the paint at 50° C. for 2 weeks | After hot storage of the paint at 50° C. for 4 weeks | 24 h after preparation of the paint | After hot storage of the paint at 50° C. for 2 weeks | After hot storage of the paint at 50° C. for 4 weeks |
| Standard defoamer emulsion of PES1 | 1.0% | 1 to 2 very few, small foam bubbles | 3 many large and small foam bubbles | 5 very many large and small foam bubbles | 1 no wetting disruption | 2 slight wetting disruption | 3 very severe wetting disruption |
| Inventive defoamer emulsion of PES4 | 1.0% | 1 no foam bubbles | 1 no foam bubbles | 1 to 2 very few, small craters | 1 no wetting disruption | 1 no wetting disruption | 1 to 2 very slight wetting disruption |

TABLE 8

| One-component woodblock flooring varnish based on polyurethane/acrylate dispersion (Alberdingk CUR 99/Primal 3188) | | | | | | | |
|---|---|---|---|---|---|---|---|
| | | Optical assessment of varnish surface for foam bubbles | | | Optical assessment of varnish surface for wetting disruption | | |
| Sample designation | Concentration used | 24 h after preparation of the varnish | After hot storage of the varnish at 50° C. for 2 weeks | After hot storage of the varnish at 50° C. for 4 weeks | 24 h after preparation of the varnish | After hot storage of the varnish at 50° C. for 2 weeks | After hot storage of the varnish at 50° C. for 4 weeks |
| Standard defoamer emulsion of PES1 | 1.0% | 1 to 2 very few, small foam bubbles | 2 large and small foam bubbles | 4 many large and small foam bubbles | 1 no wetting disruption | 2 slight wetting disruption | 4 severe wetting disruption |

TABLE 8-continued

One-component woodblock flooring varnish based on polyurethane/acrylate dispersion (Alberdingk CUR 99/Primal 3188)

| Sample designation | Concentration used | Optical assessment of varnish surface for foam bubbles | | | Optical assessment of varnish surface for wetting disruption | | |
|---|---|---|---|---|---|---|---|
| | | 24 h after preparation of the varnish | After hot storage of the varnish at 50° C. for 2 weeks | After hot storage of the varnish at 50° C. for 4 weeks | 24 h after preparation of the varnish | After hot storage of the varnish at 50° C. for 2 weeks | After hot storage of the varnish at 50° C. for 4 weeks |
| Inventive defoamer emulsion of PES4 | 1.0% | 1 no foam bubbles | 1 no foam bubbles | 1 to 2 very few, small craters | 1 no wetting disruption | 1 no wetting disruption | 2 orangepeel |

TABLE 9

Aqueous two-component woodblock flooring varnish based on acrylate/isocyanate (Luhydran N 850 S/Bayhydur VP LS 2336)

| Sample designation | Concentration used | Optical assessment of varnish surface for foam bubbles | | | Optical assessment of varnish surface for wetting disruption | | |
|---|---|---|---|---|---|---|---|
| | | 24 h after preparation of the varnish | After hot storage of the varnish at 50° C. for 2 weeks | After hot storage of the varnish at 50° C. for 4 weeks | 24 h after preparation of the varnish | After hot storage of the varnish at 50° C. for 2 weeks | After hot storage of the varnish at 50° C. for 4 weeks |
| Standard defoamer emulsion of PES1 | 1.0% | 1 to 2 very few, small foam bubbles | 2 large and small foam bubbles | 4 many large and small foam bubbles | 1 no wetting disruption | 2 slight wetting disruption | 4 severe wetting disruption |
| Inventive defoamer emulsion of PES4 | 1.0% | 1 no foam bubbles | 1 no foam bubbles | 1 to 2 very few, small craters | 1 no wetting disruption | 1 no wetting disruption | 2 orangepeel |

TABLE 10

Aqueous two-component woodblock flooring varnish based on acrylate/isocyanate (Luhydran N 850 S/Bayhydur VP LS 2336)

| Sample designation | Concentration used | Defoamer activity by the stirring test method | | | Optical assessment of varnish surface for wetting disruption | | |
|---|---|---|---|---|---|---|---|
| | | 24 h after preparation of the varnish | After hot storage of the varnish at 50° C. for 2 weeks | After hot storage of the varnish at 50° C. for 4 weeks | 24 h after preparation of the varnish | After hot storage of the varnish at 50° C. for 2 weeks | After hot storage of the varnish at 50° C. for 4 weeks |
| Standard defoamer emulsion of PES1 | 1.0% | 51 mol/g | 55 ml/g | 63 ml/g | 1 no wetting disruption | 2 slight wetting disruption | 4 severe wetting disruption |
| Inventive defoamer emulsion of PES4 | 1.0% | 50 ml/g | 51 ml/g | 53 ml/g | 1 no wetting disruption | 1 no wetting disruption | 2 orangepeel |

Formulas Used

High-Gloss Emulsion Paint Based on Straight Acrylate (Acronal DS 6250)

Part 1:

Thoroughly disperse the following:

| Water | 41 g | |
| --- | --- | --- |
| Pigmentverteiler MD 20 [pigment dispersant] | 20 g | (BASF AG, 67056 Ludwigshafen) |
| Collacral LR 8954 | 15 g | (BASF AG, 67056 Ludwigshafen) |
| Parmetol A 26 | 2 g | (Schülke und Mayr GmbH, 22840 Norderstedt) |
| ViscoPlus 3030 | 15 g | (TEGO Chemie Service GmbH, 45127 Essen) |
| Collacral LR 8989, 5% | 15 g | (BASF AG, 67056 Ludwigshafen) |
| Titanium dioxide CR 828 | 225 g | (Kerr-McGee Pigments AG, 47829 Krefeld) |

Part 2:

| Lusolvan FBH | 15 g | (BASF AG, 67056 Ludwigshafen) |
| --- | --- | --- |
| Solvenon DPM | 17 g | (Dow Chemical Company, 65824 Schwalbach) |
| Optigel S 482, 25% | 6 g | (Südchemie AG, 85368 Moosburg) |
| Acronal DS 6250 | 570 g | (BASF AG, 67056 Ludwigshafen) |
| Water | 51 g | |

Take part 2 and add part 1 with stirring.

One-Component Woodblock Flooring Varnish Based on Polyurethane/Acrylate Dispersion (Alberdingk CUR 99/Primal 3188)

Combine all of the components with stirring.

| Primal 3188 | 506 g | (Rohm and Haas S. A., 60489 Frankfurt) |
| --- | --- | --- |
| Alberdingk CUR 99 | 266 g | (Alberdingk Boley GmbH, 47829 Krefeld) |
| Water | 78 g | |
| Butyl glycol | 40 g | |
| Dowanol DPnB | 12 g | (Dow Chemical Company, 65824 Schwalbach) |
| Acrysol RM8 | 05 g | (Rohm and Haas S. A., 60489 Frankfurt) |
| Aquacer 513 | 40 g | (Byk Cera GmbH, 46462 Wesel) |
| Water | 64 g | |

Aqueous Two-Component Woodblock Flooring Varnish Based On Acrylate/Isocyanate (Luhydran N 850 S/Bayhydur VP LS 2336)

Part 1:

Thoroughly disperse the following:

| Dowanol DPnB | 40 g | (Dow Chemical Company, 65824 Schwalbach) |
| --- | --- | --- |
| Propylene glycol | 20 g | |
| Deuteron MK | 20 g | (Deuteron GmbH, 28832 Achim) |
| Butyl diglycol | 80 g | |
| Water | 40 g | |

Part 2:

| Luhydran N 850 S | 1450 g | (BASF AG, 67056 Ludwigshafen) |
| --- | --- | --- |
| Poligen WE 1 | 80 g | (BASF AG, 67056 Ludwigshafen) |
| Water | 160 g | |
| Schwego Pur 8020 | 40 g | (Schwegmann GmbH, 53501 Grafschaft Gelsdorf) |

Take part 2 and add part 1 with stirring.

Curing Component

| Bayhydur VPLS 2336 | 65 g | (Bayer MaterialScience AG, 51368 Leverkusen) |
| --- | --- | --- |
| Proglyde DMPA | 35 g | (Dow Chemical Company, 65824 Schwalbach) |

What is claimed is:

1. A process for preparing polyoxyalkylene-polysiloxane block polymers of the general formula (I)

$$C-B-(AB)_a-C^1 \quad (I)$$

in which

A is a polyoxyalkylene block of the general formula $-(C_nH_{2n}O)_b-$,

B is a polysiloxane block of the general formula $-(SiR_2-O)_c-$,

C and $C^1$ are identical or different alkoxypolyoxyalkylene radicals of the general formula $Z-O-(CH_2-CH(R^1)O)_d-$, R are identical or different $C_{1-4}$ alkyl radicals or phenyl radicals, with the proviso that at least 90% of the radicals R are methyl radicals, $R^1$ are identical or different hydrogen, $C_{1-12}$ alkyl radicals or phenyl radicals, Z is an alkyl, alkylene, aryl or alkylaryl radical, a is 1 to 20, b is an average value from 10 to 130, c is 3 to 100, d is independently at each occurrence in $C/C^1$ values from 2 to 20, with the proviso that the average value is situated in the range 2 to <15, n is 2 to 12, with an average numerical value of 2.7 to 4.0, by reacting A) polyoxyalkylene alcohols of the general formula $R^2-(O-(C_nH_{2n}O)_b-H)_e$, in which $R^2$ is an e-valent hydrocarbon radical and e is 2 to 6, with B) polysiloxanes of the general formula Cl—(R)$_2$—Si—(SiR$_2$—O)$_c$—Si(R)$_2$—Cl, which comprises also using C) polyoxyalkylene alcohols of the general formula Z—O—(CH$_2$—CH(R$^1$)O)$_d$—H to regulate the molar weight.

2. The process of claim 1, wherein the molar ratio of A:C,C$^1$ is 3 to 40 and the molar ratio of A, C, C$^1$:polysiloxanes of the general formula Cl—(R)$_2$—Si—(SiR$_2$—O)$_c$—Si(R)$_2$—Cl is 1.3 to 1.05 and e is 2 to 3.

3. The process of claim 2, wherein the molar ratio of A:C,C$^1$ is 3 to 10 and the molar ratio of A, C, C$^1$:polysiloxanes of the general formula Cl—(R)$_2$—Si—(SiR$_2$—O)$_c$—Si(R)$_2$—Cl is 1.3 to 1.1.

4. Polyoxyalkylene-polysiloxane block polymers of the general formula (I)

$$C-B-(AB)_a-C^1 \qquad (I)$$

in which

A is a polyoxyalkylene block of the general formula —(C$_n$H$_{2n}$O)$_b$—,

B is a polysiloxane block of the general formula —(SiR$_2$—O)$_c$—,

C and C$^1$ are identical or different alkoxypolyoxyalkylene radicals of the general formula Z—O—(CH$_2$—CH(R$^1$)O)$_d$—, R are identical or different C$_{1-4}$ alkyl radicals or phenyl radicals, with the proviso that at least 90% of the radicals R are methyl radicals, R$^1$ are identical or different hydrogen, C$_{1-12}$ alkyl radicals or phenyl radicals, Z is an alkyl, alkylene, aryl or alkylaryl radical, a is 1 to 20, b is an average value from 10 to 130, c is 3 to 100, d is independently at each occurrence in C/C$^1$ values from 2 to 20, with the proviso that the average value is situated in the range 2 to 12, n is 2 to 12, with an average numerical value of 2.7 to 4.0.

5. The polyoxyalkylene-polysiloxane block polymers of claim 4, wherein

A is a polyoxyalkylene block of the general formula —(C$_n$H$_{2n}$O)$_b$—,

B is a polysiloxane block of the general formula —(SiR$_2$—O)$_c$—,

C and C$^1$ are identical or different alkoxypolyoxyalkylene radicals of the general formula Z—O—(CH$_2$—CH(R$^1$)O)$_d$—, R are identical or different C$_{1-4}$ alkyl radicals or phenyl radicals, with the proviso that at least 90% of the radicals R are methyl radicals, R$^1$ are identical or different hydrogen, C$_{1-12}$ alkyl radicals or phenyl radicals, Z is an alkyl, alkylene, aryl or alkylaryl radical, a is 2 to 10, b is an average value from 20 to 100, c is 10 to 80, d is independently at each occurrence in C/C$^1$ values from 2 to 12, with the proviso that the average value is situated in the range of 5 to 10, and in which d is different than b; and n is 2 to 12, with an average numerical value of 2.7 to 4.0.

6. A method of defoaming an aqueous dispersion which comprises adding one or more polyoxyalkylene-polysiloxane block polymers of the general formula (I)

$$C-B-(AB)_a-C^1 \qquad (I)$$

in which

A is a polyoxyalkylene block of the general formula —(C$_n$H$_{2n}$O)$_b$—,

B is a polysiloxane block of the general formula —(SiR$_2$—O)$_c$—,

C and C$^1$ are identical or different alkoxypolyoxyalkylene radicals of the general formula Z—O—[CH$_2$—CH(R$^1$)O]$_d$—, R are identical or different C$_{1-4}$ alkyl radicals or phenyl radicals, with the proviso that at least 90% of the radicals R are methyl radicals, R$^1$ are identical or different hydrogen, C$_{1-12}$ alkyl radicals or phenyl radicals, Z is an alkyl, alkylene, aryl or alkylaryl radical, a is 1 to 20, b is an average value from 10 to 130, c is 3 to 100, d is independently at each occurrence in C/C$^1$ values from 2 to 20, with the proviso that the average value is situated in the range 2 to 12, n is 2 to 12, with an average numerical value of 2.7 to 4.0, to the aqueous dispersion.

* * * * *